(12) United States Patent
Sano et al.

(10) Patent No.: US 11,325,181 B2
(45) Date of Patent: May 10, 2022

(54) MOLD

(71) Applicant: YAMAHA HATSUDOKI KABUSHIKI KAISHA, Iwata (JP)

(72) Inventors: Masahiro Sano, Iwata (JP); Ryodai Ito, Iwata (JP); Akihiro Suzuki, Iwata (JP); Shimpei Takeda, Iwata (JP); Yasumi Yamamura, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 418 days.

(21) Appl. No.: 16/619,548

(22) PCT Filed: Jul. 12, 2018

(86) PCT No.: PCT/JP2018/026386
§ 371 (c)(1),
(2) Date: Dec. 5, 2019

(87) PCT Pub. No.: WO2020/012615
PCT Pub. Date: Jan. 16, 2020

(65) Prior Publication Data
US 2020/0353533 A1 Nov. 12, 2020

(51) Int. Cl.
*B22C 9/06* (2006.01)
*B22C 9/24* (2006.01)
*B22C 9/28* (2006.01)
*B22F 3/105* (2006.01)
*B22F 3/16* (2006.01)
*B33Y 80/00* (2015.01)

(52) U.S. Cl.
CPC .................. *B22C 9/06* (2013.01); *B22C 9/24* (2013.01); *B22C 9/28* (2013.01); *B22F 3/105* (2013.01); *B22F 3/16* (2013.01); *B33Y 80/00* (2014.12)

(58) Field of Classification Search
CPC ........... B22C 9/06; B22F 3/1115; B22F 5/007
See application file for complete search history.

(56) References Cited

U.S. PATENT DOCUMENTS 6,145,804 A 11/2000 Baumann et al.
2004/0228754 A1 11/2004 Abe et al.

FOREIGN PATENT DOCUMENTS

| EP | 1777479 A2 | 4/2007 |
| JP | H04307207 A | 10/1992 |
| JP | H09225971 A | 9/1997 |
| JP | 2002322501 A | 11/2002 |
| JP | 2004142427 A | 5/2004 |
| JP | 2010121187 A | 6/2010 |
| JP | 5739272 B2 | 6/2015 |

OTHER PUBLICATIONS

International Search Report of PCT/JP2018/026386.

*Primary Examiner* — James Sanders
(74) *Attorney, Agent, or Firm* — Rabin & Berdo, P.C.

(57) ABSTRACT

A mold (1) according to an embodiment of the present invention is a mold which is formed by additive manufacturing. The mold includes: a heat medium channel (10) for a heat medium to flow through, the heat medium channel being provided inside the mold; a medium introduction port (4) at which the heat medium is to be introduced into the mold; a medium discharge port (5) at which the heat medium is to be discharged out of the mold; and a buffer layer (20) located between a mold surface (1a) and the heat medium channel. The buffer layer includes a low-melting percentage portion (21) having a lower melting percentage than does any portion inside the mold other than the buffer layer.

12 Claims, 14 Drawing Sheets

(a)                      (b)

MOLD

TECHNICAL FIELD

The present invention relates to a mold, and more particularly to a mold which is formed by additive manufacturing.

BACKGROUND ART

Among various parts for vehicles and engines, some are produced via casting using a mold. For example, wheels or frame parts for vehicles and cylinder blocks or crankcases for engines are often produced by casting.

In a portion of a mold that is likely to rise to a high temperature during casting, a cooling water channel in which to flow cooling water may sometimes be created. By flowing cooling water in the cooling water channel to cool down the mold, seizing can be prevented from occurring. Seizing will induce an increase in the time and cost required for production.

The cooling water channel may be created by applying machining, using a drill or the like, to a mold which is formed by being cut out from a piece of solid material, etc. However, when a cooling water channel is created by such a technique, substantial constraints exist regarding the shape and length of the cooling water channel.

This may lead to the idea of producing a mold by using a 3D printer. Techniques for forming a stereostructure (three-dimensional object) by using a 3D printer, called additive manufacturing, have attracted attention in the recent years. Through additive manufacturing, based on 3D CAD data or 3D CG data, even a stereostructure with a complex shape can be easily produced.

When a mold is provided by additive manufacturing, a cooling water channel will be created together at the same time of producing the mold; therefore, unlike in the case of creating a cooling water channel via machining, hardly any constraints exist on the shape and length of the cooling water channel. This is expected to provide an improved cooling ability for the mold. Also, use of additive manufacturing is believed to allow the production of the mold to be achieved with a smaller amount of time and lower cost than conventionally. For example, Patent Document 1 discloses providing a mold for forming a water jacket of a cylinder block by additive manufacturing. In the mold of Patent Document 1, one long cooling water channel is allowed to extend within a thin portion corresponding to a water jacket, thus enlarging the area of the channel.

CITATION LIST

Patent Literature

[Patent Document 1] Japanese Patent No. 5739272

SUMMARY OF INVENTION

Technical Problem

The inventors have conducted further studies to find that, when a mold is produced by additive manufacturing, cooling ability may be improved, but cooling water may leak through cracks that have occurred.

Cracks due to thermal fatigue may occur on the mold surface. The cause for thermal fatigue is a temperature difference between the melt and a release agent. For example, while the temperature of an aluminum alloy melt may be on the order of 600° C., the temperature of the release agent may be about 30° C. Moreover, the inner peripheral surface of the cooling water channel is susceptible to a tensile thermal stress caused by a temperature difference with the mold surface, thus possibly suffering cracks. The gradient of temperature change becomes steeper as the cooling water channel becomes closer to the mold surface, whereby cracks become more likely to occur.

Thus, cracks may occur on the mold surface and on the inner peripheral surface of the cooling water channel. If cracks on each of the mold surface and the inner peripheral surface grow, the cooling water may possibly leak to the outside of the mold.

The present invention has been made in view of the above problems, and an objective thereof is, in a mold which is formed by additive manufacturing, to prevent leaks of the heat medium that are ascribable to crack growth.

Solution to Problem

A mold according to an embodiment of the present invention is a mold which is formed by additive manufacturing, comprising: a heat medium channel for a heat medium to flow through, the heat medium channel being provided inside the mold; a medium introduction port at which the heat medium is to be introduced into the mold; a medium discharge port at which the heat medium is to be discharged out of the mold; and a buffer layer located between a mold surface and the heat medium channel, wherein, the buffer layer includes a low-melting percentage portion having a lower melting percentage than does any portion inside the mold other than the buffer layer.

In one embodiment, the low-melting percentage portion has a melting percentage of 50% or less.

In one embodiment, the low-melting percentage portion is composed of unsintered or unmelted metal powder.

In one embodiment, the buffer layer further includes a heat-conducting portion having a higher melting percentage than does the low-melting percentage portion, the heat-conducting portion continuing from a first end face at the heat medium channel side, to a second end face at the mold surface side, of the buffer layer.

In one embodiment, the melting percentage of the heat-conducting portion is substantially equal to that of the portion inside the mold other than the buffer layer.

In one embodiment, the heat-conducting portion has a three-dimensional mesh shape.

In one embodiment, the heat-conducting portion has a three-dimensional honeycomb shape.

In one embodiment, the heat-conducting portion has a two-dimensional honeycomb shape.

In one embodiment, the heat-conducting portion comprises a plurality of columnar bodies extending from the first end face to the second end face.

In one embodiment, the buffer layer has a thickness of 2.0 mm or more.

In one embodiment, the heat medium channel has a three-dimensional honeycomb shape.

In one embodiment, the heat medium channel has a two-dimensional honeycomb shape.

In one embodiment, the mold is a mold for forming at least a portion of a wheel for vehicles, a frame part for vehicles, a cylinder block, or a crankcase.

A mold according to an embodiment of the present invention includes a buffer layer located between the mold surface and the heat medium channel, the buffer layer including a low-melting percentage portion having a lower melting percentage than does any portion inside the mold other than the buffer layer. The low-melting percentage portion of the buffer layer is a portion having a lower continuity (as a structural body), i.e., a higher discontinuity, than does any other portion, thus defining portions where cracks are less likely to grow. Therefore, since the buffer layer is located between the mold surface and the heat medium channel, even if a crack occurs at the heat medium channel side, its growth toward the mold surface can be prevented with the buffer layer. As a result, in a mold according to an embodiment of the present invention, leaks of the heat medium can be prevented.

From the standpoint of preventing crack growth, the melting percentage of the low-melting percentage portion is preferably as low as possible; specifically, it is preferably 50% or less.

When the low-melting percentage portion is composed of unsintered or unmelted metal powder, the low-melting percentage portion has a melting percentage which is substantially 0%, thus resulting in a high effect of preventing crack growth.

The buffer layer may include a heat-conducting portion having a higher melting percentage than does the low-melting percentage portion, such that the heat-conducting portion continues from a first end face at the heat medium channel side, to a second end face at the mold surface side, of the buffer layer. Since the heat-conducting portion allows heat from the mold surface side to be conducted to the heat medium channel side (or conversely, heat from the heat medium channel side to the mold surface side), the buffer layer including the heat-conducting portion allows temperature control by the heat medium channel to be performed more suitably.

From the standpoint of suitably allowing heat to be conducted from the mold surface side to the heat medium channel side, or from the heat medium channel side to the mold surface side, the melting percentage of the heat-conducting portion is preferably as high as possible, and most preferably is substantially equal to that of any portion inside the mold other than the buffer layer.

The heat-conducting portion may have a three-dimensional mesh shape, a three-dimensional honeycomb shape, or a two-dimensional honeycomb shape, for example. Alternatively, the heat-conducting portion may be a plurality of columnar bodies extending from the first end face to the second end face. Irrespective of which one of the above constructions the heat-conducting portion may have, heat conduction can be suitably performed.

The thickness of the buffer layer is preferably 2.0 mm or more. When the thickness of the buffer layer is 2.0 mm or more, the effect of preventing crack growth can be attained with a greater certainty.

When the heat medium channel has a three-dimensional honeycomb shape or a two-dimensional honeycomb shape, it becomes possible to allow the heat medium to flow uniformly and so as to constitute a turbulence within the mold. This allows temperature control of the mold to be suitably achieved with the heat medium channel. When the heat medium channel has a three-dimensional honeycomb shape or a two-dimensional honeycomb shape, the proportion inside the mold that is accounted for by the heat medium channel can be easily increased. Therefore, the amount of raw material required for producing the mold can be reduced, or the amount of time required for production can be reduced. Furthermore, the fact that the heat medium channel has a three-dimensional honeycomb shape or a two-dimensional honeycomb shape may mean that the inside of the mold is essentially uniformly thinned out (made thinner). Therefore, the residual stress occurring when producing (shaping) the mold by additive manufacturing can be reduced, thus resulting in an advantage in that warpage or other deformations and fissures can be suppressed.

Embodiments of the present invention are suitably used for molds for forming at least a portion of a wheel for vehicles or a frame part for vehicles. Moreover, embodiments of the present invention are also suitably used for molds for forming at least a portion of an engine part such as a cylinder block or a crankcase.

Advantageous Effects of Invention

In accordance with an embodiment of the present invention, in a mold which is formed by additive manufacturing, leaks of the heat medium that are ascribable to crack growth can be prevented.

DESCRIPTION OF EMBODIMENTS

Hereinafter, with reference to the drawings, embodiments of the present invention will be described. Note that the present invention is not limited to the following embodiments.

Figure 1:
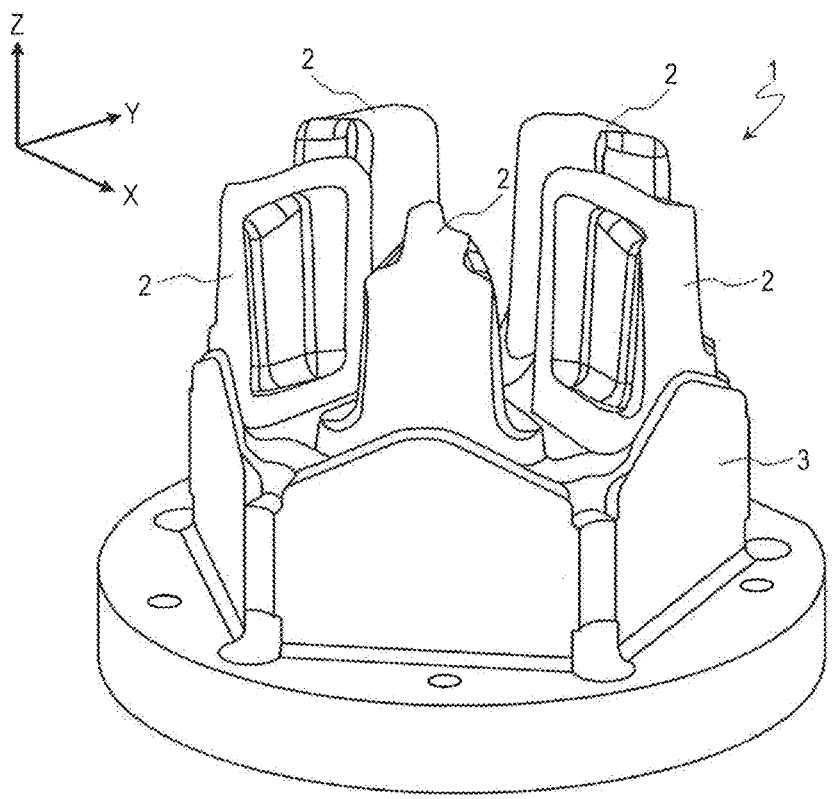
FIG. 1 is a perspective view schematically showing a mold 1 according to an embodiment of the present invention.

With reference to FIG. 1, a mold 1 according to the present embodiment will be described. FIG. 1 is a perspective view schematically showing the mold 1.

The mold 1 is a mold for forming a portion of a wheel for vehicles, or more specifically, a hub. The overall shape of the mold for forming the wheel for vehicles may be any known shape, and therefore the description thereof is omitted here. FIG. 1 shows three directions that are orthogonal to one another (the X direction, the Y direction, and the Z direction). The X direction and the Y direction correspond to radial directions of the wheel.

As will be described in detail later, the mold 1 is formed by additive manufacturing.

The mold 1 includes a plurality (e.g., five herein) of protrusions 2 extending along the Z direction (vertical direction) and a base 3 supporting the plurality of protrusions 2.

The mold 1 has heat medium channels (not shown in FIG. 1) that are provided inside it. As a heat medium flows through the heat medium channels, the mold 1 is cooled and/or heated. The heat medium for cooling purposes may be water, for example. The heat medium for heating purposes may be oil, for example. Herein, the heat medium channels are respectively provided for the corresponding ones of the plurality of protrusions 2.

Figure 2:
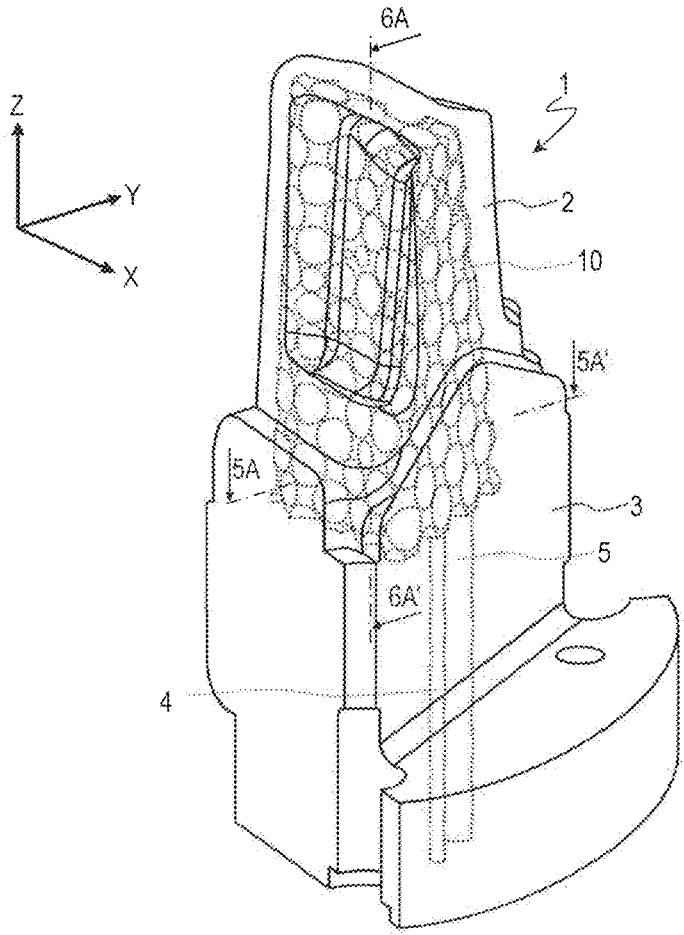
FIG. 2 is a perspective view schematically showing a portion of the mold 1, where a heat medium channel 10 inside the mold 1 is depicted with dotted lines.
Figure 3:
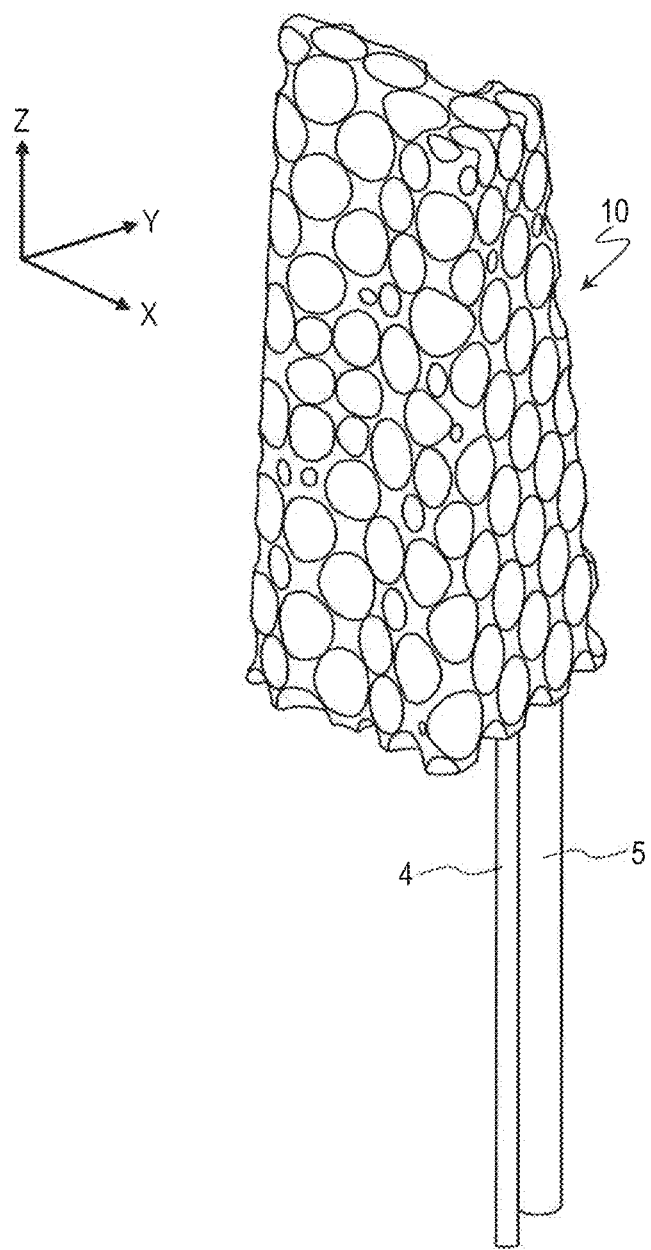
FIG. 3 is a perspective view schematically showing the heat medium channel 10.
Figure 4:
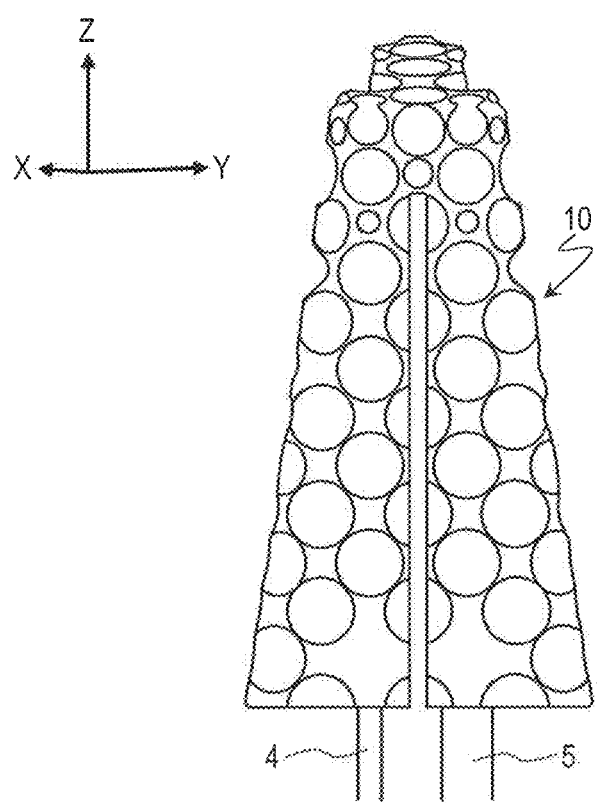
FIG. 4 is a diagram showing the heat medium channel 10 as viewed from a direction which is slightly inclined from the X direction.

Now, with reference to FIG. 2, FIG. 3, and FIG. 4, a more specific construction of the mold 1 will be described. FIG. 2 is a perspective view showing, enlarged, a portion of the mold 1 shown in FIG. 1 (a portion corresponding to one protrusion 2), where a heat medium channel 10 inside the mold 1 is also depicted with dotted lines. FIG. 3 is a perspective view showing the heat medium channel 10. FIG. 4 is a diagram showing the heat medium channel 10 as viewed from a direction which is slightly inclined from the X direction.

As shown in FIG. 2, FIG. 3, and FIG. 4, the mold 1 includes the heat medium channel 10, a medium introduction port 4, and a medium discharge port 5. The medium introduction port 4 is an inlet for the heat medium, i.e., a portion at which the heat medium is introduced into the mold 1. The medium discharge port 5 is an outlet for the heat medium, i.e., a portion at which the heat medium is discharged out of the mold 1. The medium introduction port 4 and the medium discharge port 5 are each provided in the base 3. Moreover, the medium introduction port 4 and the medium discharge port 5 are each connected to the heat medium channel 10.

The heat medium channel 10 in the present embodiment has a three-dimensional honeycomb shape. In other words, the heat medium channel 10 has a three-dimensional meshed structure in which unit structures of substantially the same shape are arranged so as to leave no spaces. Since the heat medium channel 10 has a three-dimensional honeycomb shape, as will be described in detail later, the heat medium is allowed to flow uniformly and so as to constitute a turbulence within the mold 1. This allows temperature control of the mold 1 to be suitably achieved with the heat medium channel 10. The specific structure of the heat medium channel 10 will be described in detail later.

Figure 5:
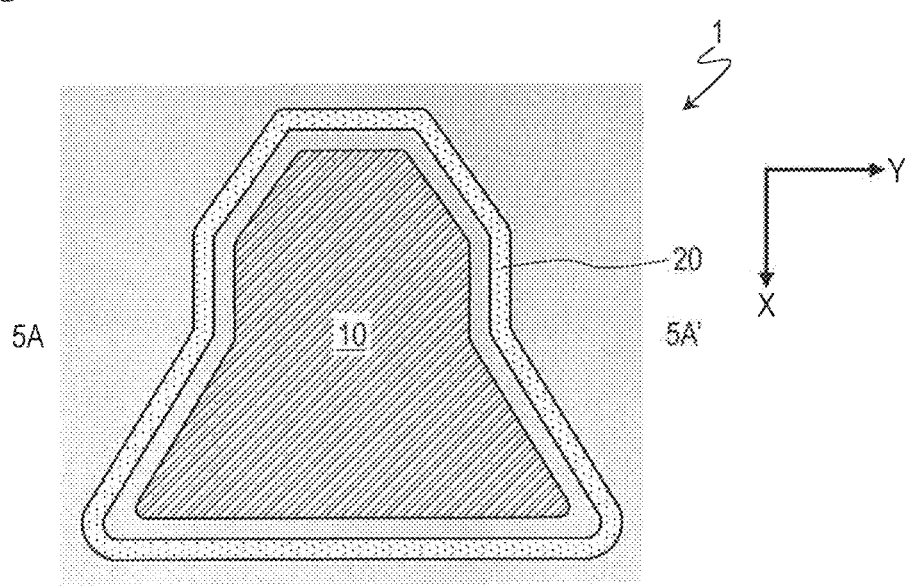
FIG. 5 is a cross-sectional view taken along an XY plane that contains line 5A-5A' in FIG. 2.
Figure 6:
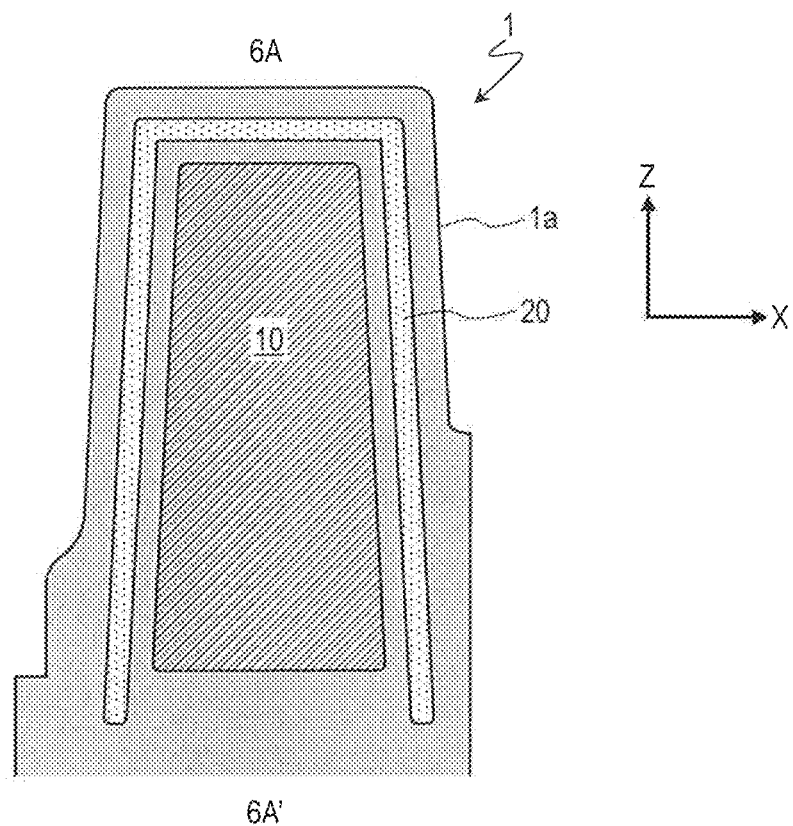
FIG. 6 is a cross-sectional view taken along a ZX plane that contains line 6A-6A' in FIG. 2.

Although not shown in FIG. 2, the mold 1 further includes a buffer layer inside it. Hereinafter, the construction of this buffer layer will be described with reference to FIG. 5 and FIG. 6. FIG. 5 is a cross-sectional view taken along an XY plane that contains line 5A-5A' in FIG. 2, and FIG. 6 is a cross-sectional view taken along a ZX plane that contains line 6A-6A' in FIG. 2. In FIG. 5 and FIG. 6, for ease of explanation, the heat medium channel 10 is shown while simplifying detailed features thereof.

As shown in FIG. 5 and FIG. 6, the mold 1 includes a buffer layer 20 inside it. The buffer layer 20 is located between a mold surface 1a and the heat medium channel 10. The buffer layer 20 includes portions (hereinafter referred to as "low-melting percentage portions") having a lower melting percentage than does any portion inside the mold other than the buffer layer 20. As will be described later, the mold 1 is produced by irradiating a deposited metal powder with laser light to sinter or melt it. The "melting percentage" refers to, within all metal powder in a given region, a proportion of metal powder that has sintered/melted. The melting percentage can be measured through microscopic observation, for example. Portions other than the buffer layer 20 typically have a melting percentage of 99.90% or more.

Figure 7:
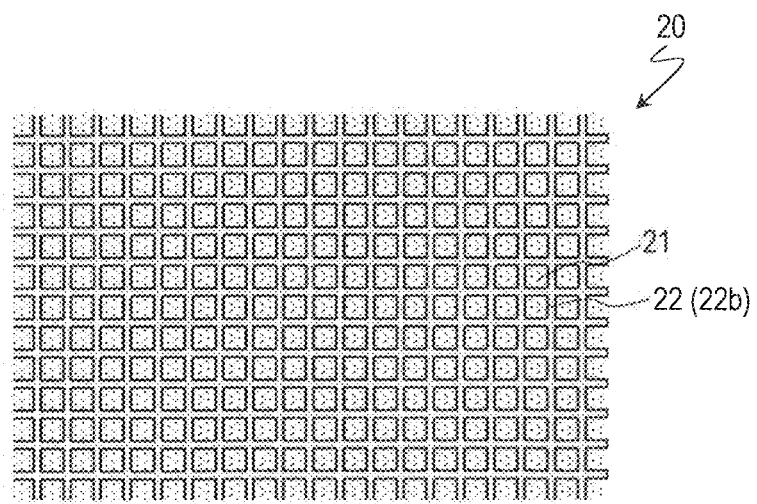
FIG. 7 is a diagram showing an example of a buffer layer 20 of the mold 1, FIG. 7 being a cross-sectional view taken along a plane which is orthogonal to the thickness direction.
Figure 8:
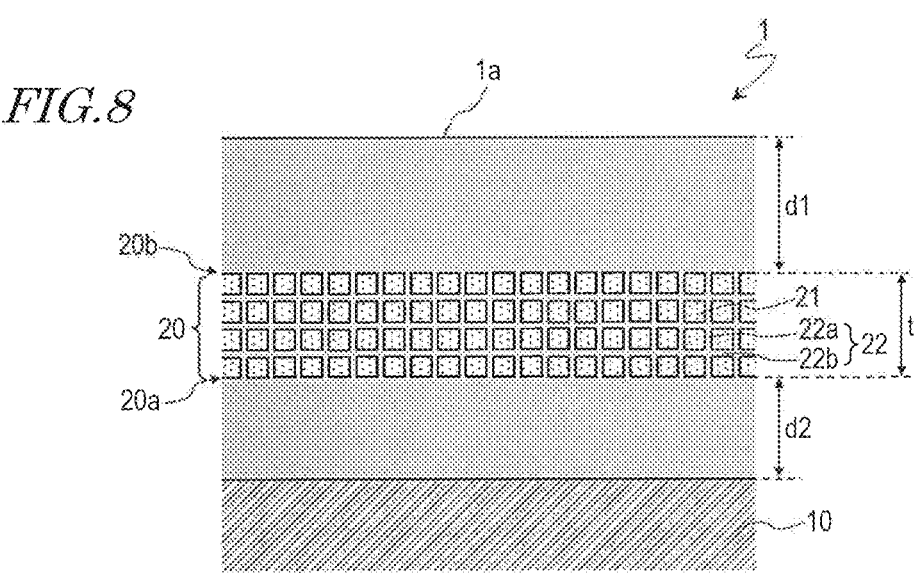
FIG. 8 is a diagram showing the buffer layer 20 and its neighborhood, FIG. 8 being a cross-sectional view taken along the thickness direction of the buffer layer 20.

Now, with reference to FIG. 7 and FIG. 8, a specific construction of the buffer layer 20 will be described. FIG. 7 is a diagram showing an example of the buffer layer 20, FIG. 7 being a cross-sectional view taken along a plane which is orthogonal to the thickness direction. FIG. 8 is a diagram showing the buffer layer 20 and its neighborhood, FIG. 8 being a cross-sectional view taken along the thickness direction of the buffer layer 20.

In the example shown in FIG. 7 and FIG. 8, the buffer layer 20 includes low-melting percentage portions 21 and a heat-conducting portion 22.

The low-melting percentage portions 21 are portions inside the mold that have a lower melting percentage than does any portion other than the buffer layer 20. Herein, the low-melting percentage portions 21 are composed of unsintered or unmelted metal powder. In other words, the low-melting percentage portions 21 have a melting percentage of substantially 0%.

The heat-conducting portion 22 is a portion having a higher melting percentage than do the low-melting percentage portions 21. The melting percentage of the heat-conducting portion 22 is equal to the melting percentage of any portion inside the mold 1 other than the buffer layer 20, for example. Moreover, the heat-conducting portion 22 continues from an end face (hereinafter referred to as the "first end face") 20a on the heat medium channel 10 side to an end face (hereinafter referred to as the "second end face") 20b on the mold surface 1a side of the buffer layer 20. In the example shown, the heat-conducting portion 22 has a three-dimensional mesh shape (a three-dimensional lattice shape) that includes a plurality of linear portions 22a extending along the thickness direction of the buffer layer 20 and a plurality of linear portions 22b extending along a direction that fits within the layer plane of the buffer layer 20.

As described above, the mold 1 of the present embodiment includes the buffer layer 20 being located between the mold surface 1a and the heat medium channel 10, such that the buffer layer 20 includes the low-melting percentage portions 21 having a relatively low melting percentage. The low-melting percentage portions 21 of the buffer layer 20 are portions having a lower continuity (as a structural body), i.e., a higher discontinuity, than does any other portion, thus defining portions where cracks are less likely to grow. Therefore, since the buffer layer 20 is located between the mold surface 1a and the heat medium channel 10, even if a crack occurs at the heat medium channel 10 side, its growth onto the mold surface 1a side can be prevented by the buffer layer 20. As a result, in the mold 1 of the present embodiment, leaks of the heat medium can be prevented.

In the example shown in FIG. 7 and FIG. 8, the buffer layer 20 also includes the heat-conducting portion 22. The heat-conducting portion 22 has a higher melting percentage than do the low-melting percentage portions 21, and continues from the first end face 20a to the second end face 20b of the buffer layer 20, thus allowing heat from the mold surface 1a side to be conducted to the heat medium channel 10 side (or conversely, heat from the heat medium channel 10 side to be conducted to the mold surface 1a side). Since the buffer layer 20 includes the heat-conducting portion 22 as such, temperature control with the heat medium channel 10 can be performed more suitably.

From the standpoint of suitably allowing heat to be conducted from the mold surface 1a side to the heat medium channel 10 side, or from the heat medium channel 10 side to the mold surface 1a side, the melting percentage of the heat-conducting portion 22 is preferably as high as possible, and most preferably is substantially equal to that of any portion inside the mold other than the buffer layer 20.

The thickness t (see FIG. 8) of the buffer layer 20 is preferably 2.0 mm or more. When the thickness t of the buffer layer 20 is 2.0 mm or more, the effect of preventing crack growth can be attained with a greater certainty.

The distance d1 from the buffer layer 20 to the mold surface 1a and the distance d2 from the buffer layer 20 to the heat medium channel 10 (see FIG. 8 for both of d1 and d2) is not particularly limited. Also, the size regarding the mesh holes and wire diameter of the heat-conducting portion 22 having a three-dimensional mesh shape are not particularly limited. That is, there is no particular limitation as to the width and interval of the plurality of linear portions 22a and 22b constituting the heat-conducting portion 22.

[Method of Producing the Mold]

A method of producing the mold 1 according to the present embodiment will be described.

The mold 1 is formed by using additive manufacturing. As for additive manufacturing, various techniques using a 3D printer may be employed; for example, a laser sintering method or a laser melting method may be suitably used.

Specifically, the production method according to the present embodiment includes: a deposition step of depositing a metal powder in a layer with a predetermined thickness; and a laser irradiation step of, after the deposition step, irradiating the deposited metal powder with laser light to sinter or melt it. By alternately repeating the deposition step and the laser irradiation step, the mold 1 internally including the heat medium channels 10 and the buffer layer 20 can be formed.

As the metal powder, various metal powders can be used; for example, maraging steels or equivalents of SKD61 steel can be suitably used. The thickness of metal powder to be deposited in a single deposition step may be, e.g., 20 µm to 100 µm.

[Melting Percentage of Low-Melting Percentage Portions]

Although the above description illustrates a case where the low-melting percentage portions 21 have a melting percentage which is substantially 0%, i.e., the low-melting percentage portions 21 are composed substantially only of unsintered or unmelted metal powder, embodiments of the present invention are not limited to such construction. The melting percentage of the low-melting percentage portions 21 may be greater than 0%. In other words, the low-melting percentage portions 21 may be a region which did not undergo laser irradiation during production of the mold 1, or a region which underwent laser irradiation at a weaker intensity and/or in a shorter time than did any other portion.

However, it can be said that a region has a higher discontinuity as it has a lower melting percentage. Therefore, from the standpoint of preventing crack growth, the melting percentage of the low-melting percentage portions 21 is preferably as low as possible. Specifically, it is preferably 50% or less, and more preferably substantially 0%, i.e., the low-melting percentage portions 21 is composed substantially only of unsintered or unmelted metal powder.

[Heat Medium Channel of a Three-Dimensional Honeycomb Shape]

Figure 9:
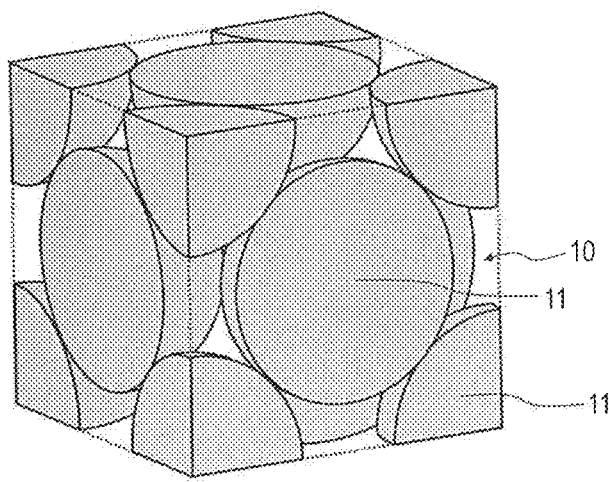
FIG. 9 is a perspective view showing a portion of the heat medium channel 10 having a three-dimensional honeycomb shape, as cut along the XY plane, the YZ plane, and the ZX plane.

With reference to FIG. 2, FIG. 3, and FIG. 4, and also FIG. 9, the structure of the heat medium channel 10 will be described more specifically. FIG. 9 is a perspective view showing a portion of the heat medium channel 10 as cut along the XY plane, the YZ plane, and the ZX plane.

As shown in FIG. 9, a region inside the mold 1 where a heat medium channel 10 is provided is divided by the heat medium channel 10 of a three-dimensional honeycomb shape, into a plurality of portions (portions where metal material composing the mold 1 exists; hereinafter referred to as "solid portions") 11 that are arranged in a three-dimensional array. In the example shown here, each solid portion 11 is substantially spherical.

Figure 10:
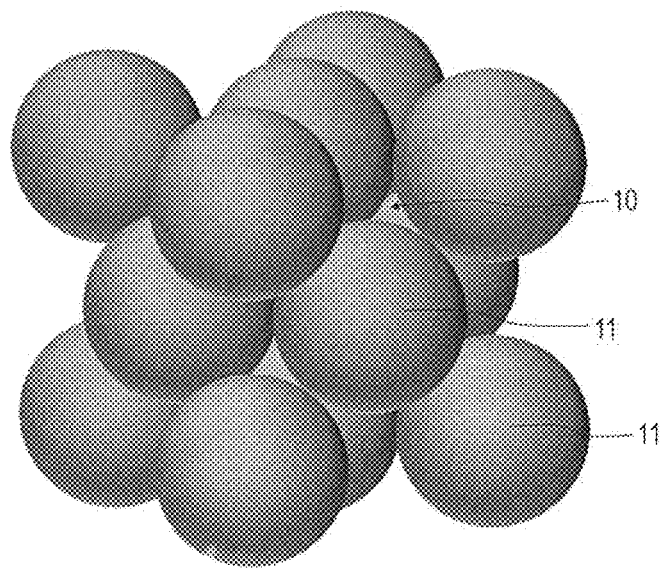
FIG. 10 is a diagram where all solid portions 11 shown in FIG. 9 are depicted as perfect spheres.

In the example shown in FIG. 9, the plurality of solid portions 11 are arranged in a face-centered cubic lattice. In other words, a solid portion 11 is located at each vertex and at the center of each face of the region corresponding to a unit cell. Note that, since FIG. 9 shows a portion corresponding to one unit cell, the solid portions 11 are depicted as either hemispheres or ⅛ spheres. FIG. 10 is a diagram where all solid portions 11 shown in FIG. 9 are depicted as perfect spheres.

Each of the plurality of solid portions 11 abuts with an adjoining solid portion 11 in part. In other words, each solid portion 11 is connected to an adjoining solid portion 11.

Since the plurality of solid portions 11 are arranged as described above, the unit structure of the three-dimensional honeycomb is a portion which remains after removing the solid portions 11 from a single unit cell of a face-centered cubic lattice. Therefore, the unit structure of the three-dimensional honeycomb (the unit structure of a heat medium channel 10) is continuous within the unit cell, and also is continuous with the unit structure of adjoining unit cells.

Now, the reason why the heat medium channels 10 having a three-dimensional honeycomb shape allow temperature control of the mold 1 to be suitably performed will be described.

When a heat medium flows in a heat medium channel 10 having the aforementioned structure, the heat medium proceeds while repeatedly bouncing against a solid portion 11 and then ramifying. Although many routes exist for the heat medium to travel through the heat medium channel 10, each and every route repeatedly involves such ramifications, so that there is no one route in which the heat medium travels particularly fast. Therefore, the heat medium relatively uniformly flows in the mold 1. Moreover, since each and every route repeatedly involves such ramifications, the heat medium is likely to present a turbulence rather than a laminar flow.

Thus, since each heat medium channel 10 has a three-dimensional honeycomb shape, the heat medium is allowed to flow uniformly and so as to constitute a turbulence within the mold 1. This allows temperature control of the mold 1 to be suitably achieved with the heat medium channel 10. Moreover, unlike in Patent Document 1 where a single long channel is allowed to extend, it is possible to prevent the heat medium from having difficulties in flowing due to a pressure loss, and also prevent the heat medium from rising or falling extremely in temperature.

Moreover, when each heat medium channel has a three-dimensional honeycomb shape, the proportion inside the mold 1 that is accounted for by the heat medium channels 10 can be made relatively high. This makes it possible to reduce the amount of material used when forming the mold 1 by additive manufacturing, shorten the time required for formation, or increase the amount of heat medium to flow inside the mold 1.

Furthermore, the fact that the heat medium channel 10 has a three-dimensional honeycomb shape may mean that the inside of the mold 1 is essentially uniformly thinned out (made thinner). Therefore, the residual stress occurring when producing (shaping) the mold 1 by additive manufacturing can be reduced, thus resulting in an advantage in that warpage or other deformations and fissures can be suppressed.

Moreover, each of the plurality of solid portions 11 abuts with an adjoining solid portion 11 in part. In other words, each solid portion 11 is connected to an adjoining solid portion 11. Therefore, the plurality of solid portions 11 have a three-dimensional truss structure, as it were. As a result, even if the proportion in the mold 1 that is accounted for by the heat medium channels 10 is made relatively high, sufficient rigidity can be obtained.

Note that the shape of the unit structure of the three-dimensional honeycomb is not limited to what is illustrated herein. In other words, the shape of each solid portion 11 is not limited to what is illustrated herein. Each solid portion 11 may be substantially polyhedral. As a substantially polyhedral solid portion 11, a solid portion 11 of shapes having high symmetry, e.g., a truncated icosahedron (which is known as a soccer-ball shape), can be suitably used. Regardless of whether the solid portions 11 are substantially spherical or substantially polyhedral, there is provided an effect of allowing the heat medium to flow uniformly and so as to constitute a turbulence.

The size (e.g., in the case where the solid portion 11 is substantially spherical, its ball diameter) of each solid portion 11 may be set as appropriate, so long as each solid portion 11 is in contact with an adjacent solid portion 11 and as the heat medium channel 10 is not disrupted.

Figure 11:
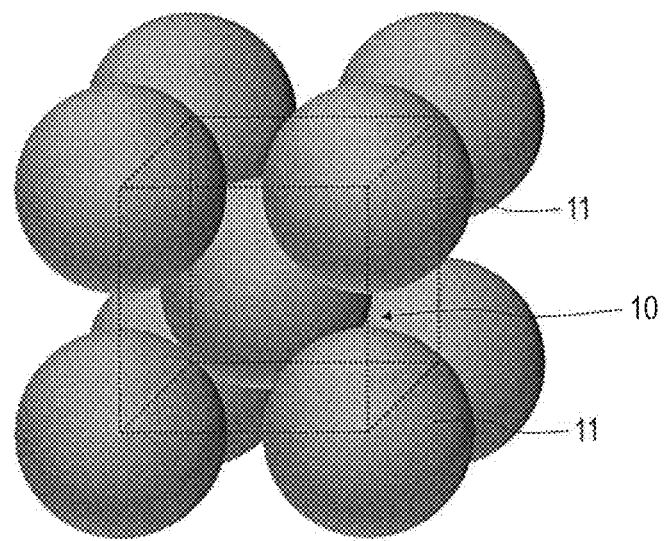
FIG. 11 is a diagram showing another exemplary arrangement of the solid portions 11.
Figure 12:
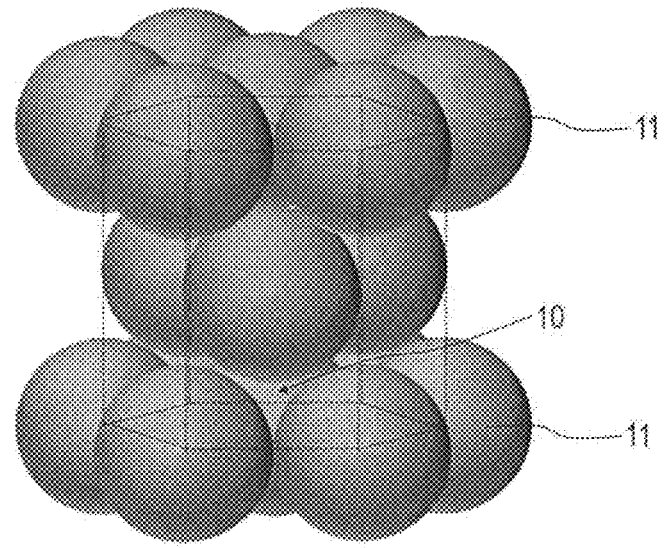
FIG. 12 is a diagram showing another exemplary arrangement of the solid portions 11.

Moreover, the arrangement of the solid portions 11 is not limited to a face-centered cubic lattice. For example, the solid portions 11 may be arranged in a body-centered cubic lattice, as shown in FIG. 11. When the solid portions 11 are arranged in a body-centered cubic lattice, the solid portions 11 are located at each vertex and at the center of the cubic unit cell. Alternatively, as shown in FIG. 12, the solid portions 11 may be arranged in a hexagonal lattice (also called a hexagonal close-packed structure). Note that the region having the shape of a hexagonal cylinder that is indicated with dotted lines in FIG. 12 is a region corresponding to three unit cells.

Moreover, the arrangement of the solid portions 11 is not limited to the three arrangements illustrated above. For example, as a crystal structure of an ionic crystal, the sodium chloride structure is known. In the sodium chloride structure, chloride ions take a face-centered cubic lattice structure, while sodium ions fit in six coordinates presenting an octahedron within it. The sodium ions also form another face-centered cubic lattice. An arrangement resembling the sodium chloride structure as such may be adopted. In other words, the solid portions 11 may be arranged at positions of the chloride ions, while at positions of the sodium ions, solid portions 11 of a different size (or ball diameter, in the case where the solid portions 11 are substantially spherical) from that of the solid portions 11 in the chloride ion positions may be arranged.

From the standpoint of attaining the effect of allowing the heat medium to flow uniformly and so as to constitute a turbulence, it is preferable that the plurality of solid portions 11 are arranged regularly. The arrangement of the solid portions 11 illustrated in the above description is a preferable arrangement in this regard.

Although an example has been described where each protrusion 2 of the mold 1 includes a set consisting of the heat medium channel 10, the medium introduction port 4, and the medium discharge port 5 (i.e., there being five sets in the entire mold 1), it will be appreciated that the present invention is not limited to this example. The number of sets of the heat medium channel 10, the medium introduction port 4, and the medium discharge port 5 may be one or more, as appropriately set in accordance with the type, size, purpose, etc., of the mold.

Figure 13:
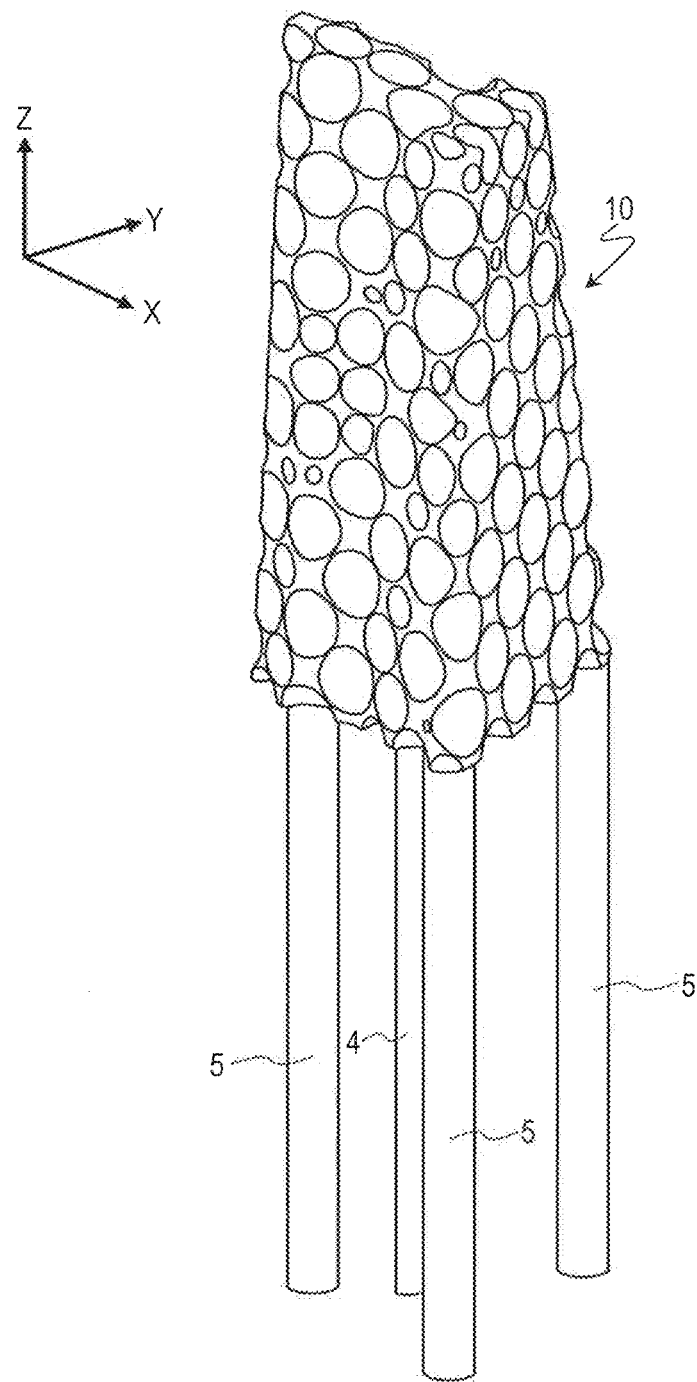
FIG. 13 is a diagram showing an example where a plurality of medium discharge ports 5 are provided for the heat medium channel 10.

Moreover, in the example shown in FIG. 2 and the like, one medium introduction port 4 and one medium discharge port 5 are provided for each heat medium channel 10; however, a plurality of medium introduction ports 4 and/or medium discharge ports 5 may be provided. For example, as shown in FIG. 13, one medium introduction port 4 and three medium discharge ports 5 may be provided for each heat medium channel 10.

[Other Constructions of Heat Medium Channel]

Although the above description illustrates a case where each heat medium channel 10 has a three-dimensional honeycomb shape, the shape of the heat medium channel 10 is not limited thereto. For example, the heat medium channel 10 may have a two-dimensional honeycomb shape.

Figure 14:
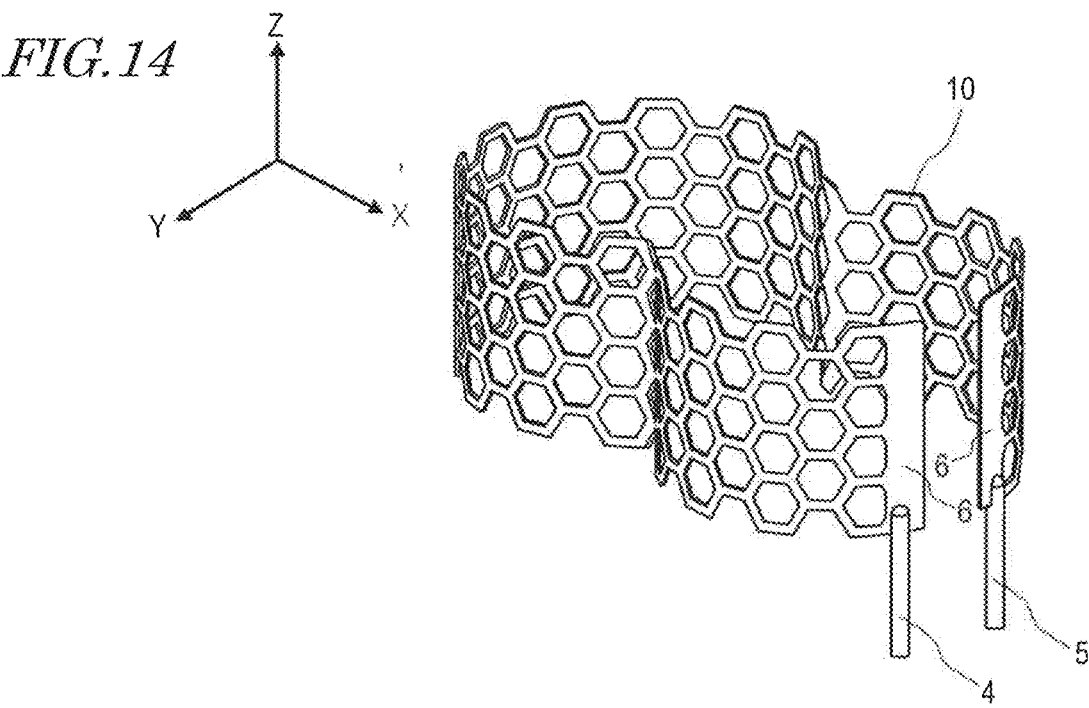
FIG. 14 is a perspective view showing another example of a heat medium channel 10.

An example of a heat medium channel 10 having a two-dimensional honeycomb shape is shown in FIG. 14. FIG. 14 is a perspective view schematically showing the heat medium channel 10.

The heat medium channel 10 shown in FIG. 14 has a two-dimensional honeycomb shape. In other words, the heat medium channel 10 has a two-dimensional meshed structure in which unit structures of substantially the same shape are arranged so as to leave no spaces. Since the heat medium channel 10 has a two-dimensional honeycomb shape, as will be described in detail later, the heat medium is allowed to flow uniformly and so as to constitute a turbulence within the mold 1. This allows temperature control of the mold 1 to be suitably achieved with the heat medium channel 10.

Figure 15:
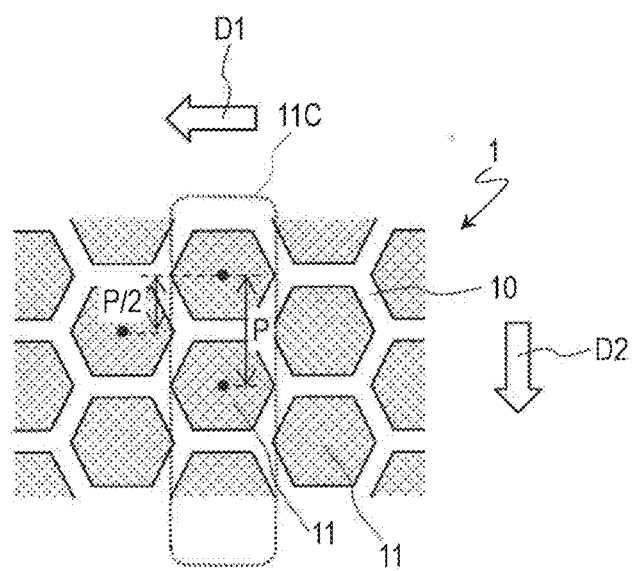
FIG. 15 is a plan view showing, enlarged, a portion of a heat medium channel 10.

Hereinafter, with further reference to FIG. 15, the structure of the heat medium channel 10 will be described more specifically. FIG. 15 is a plan view showing, enlarged, a portion of the heat medium channel 10.

As shown in FIG. 15, a region inside the mold 1 where the heat medium channel 10 is provided is divided by the heat medium channel 10 having a two-dimensional honeycomb shape, into a plurality of portions (solid portions) 11 that are arranged in an array. In the example shown in FIG. 14 and FIG. 15, the unit structure of the two-dimensional honeycomb is a framework of substantial hexagons, and more specifically a framework of substantial regular hexagons. Therefore, each solid portion 11 has a substantially hexagonal shape, and more specifically a substantially regular hexagonal shape. However, the shape of each solid portion 11 is not limited to what is illustrated herein.

FIG. 15 shows: a direction (hereinafter referred to as the "first direction") D1 along which the heat medium as a whole flows in the heat medium channel 10 from the medium introduction port 4 side to the medium discharge port 5 side; and a direction (hereinafter referred to as the "second direction") D2 which is substantially orthogonal to the first direction D1. The plurality of solid portions 11 are arranged so as to constitute a plurality of solid portion rows 11C. Each solid portion row 11C includes two or more solid portions 11 that are arranged along the second direction D2, whereas the plurality of solid portion rows 11C are disposed side by side along the first direction D1. In the example shown in FIG. 14, solid portion rows 11C each including four solid portions 11 and solid portion rows 11C each including three solid portions 11 are alternately arranged. Note that the number of solid portion rows 11C and the number of solid portions 11 included in each solid portion row 11C are not limited to what is illustrated in FIG. 14 and the like.

The two or more solid portions 11 included in each solid portion row 11C are arranged with a predetermined pitch P along the second direction D2. In the example shown, every two adjacent solid portion rows 11C are arranged so that the positions of their respective solid portions 11 along the second direction D2 are offset by substantially a half of the pitch P.

In the example shown in FIG. 14, the heat medium channel 10 (i.e., the portion having a two-dimensional honeycomb shape) is connected to the medium introduction port 4 and the medium discharge port 5 via plate-like broad portions 6 (see FIG. 15) extending along the second direction D2 (which herein is the Z direction); however, the broad portions 6 may be omitted.

Figure 16:
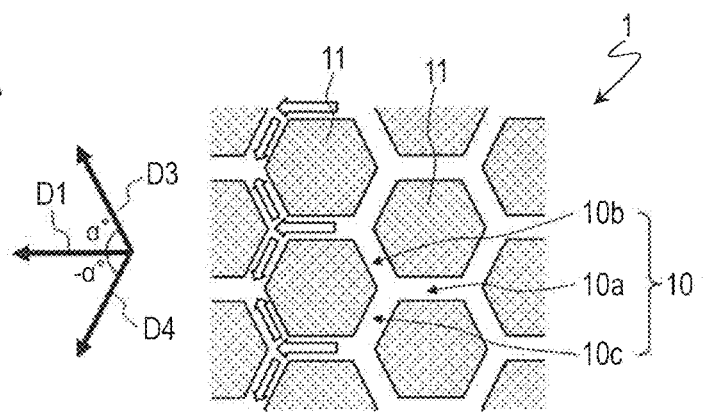
FIG. 16 is a plan view showing further, enlarged, a portion of the heat medium channel 10.

FIG. 16 shows further, enlarged, a portion of the heat medium channel 10. As shown in FIG. 16, the heat medium channel 10 is composed of: portions (hereinafter referred to as "first portions") 10a extending substantially in parallel to the first direction D1; portions (hereinafter referred to as "second portions") 10b extending from the end of each first portion 10a substantially in parallel to a third direction D3 which is different from the first direction D1; and portions (hereinafter referred to as "third portions") 10c extending from the end of each first portion 10a substantially in parallel to a fourth direction D4 which is different from the first direction D1 and the third direction D3. In the example shown, the third direction D3 makes an angle of $+\alpha°$ (i.e., $\alpha°$ clockwise) with respect to the first direction D1, while the fourth direction D4 makes an angle of $-\alpha°$ (i.e., $\alpha°$ counterclockwise) with respect to the first direction D1. That is, the third direction D3 and the fourth direction D4 are mutually symmetric directions with respect to the first direction D1.

Now, the reason why the heat medium channel 10 having a two-dimensional honeycomb shape allow temperature control of the mold 1 to be suitably performed will be described.

When a heat medium flows in the heat medium channel 10 having the aforementioned structure, as is schematically indicated by blank arrows in FIG. 16, the heat medium comes flowing in a first portion 10a, bounces against a solid portion 11 at the end of the first portion 10a, and ramifies into a second portion 10b and a third portion 10c. Although many routes exist for the heat medium to travel through the heat medium channel 10, each and every route repeatedly involves such ramifications, so that there is no one route in which the heat medium travels particularly fast. Therefore, the heat medium relatively uniformly flows in the mold 1. Moreover, since each and every route repeatedly involves such ramifications, the heat medium is likely to present a turbulence rather than a laminar flow.

Thus, since the heat medium channel 10 has a two-dimensional honeycomb shape, the heat medium is allowed to flow uniformly and so as to constitute a turbulence within the mold 1. This allows temperature control of the mold 1 to be suitably achieved with the heat medium channel 10. Moreover, unlike in Patent Document 1 where a single long channel is allowed to extend, it is possible to prevent the heat medium from having difficulties in flowing due to a pressure loss, and also prevent the heat medium from rising or falling extremely in temperature.

Moreover, when the heat medium channel has a two-dimensional honeycomb shape, the proportion inside the mold 1 that is accounted for by the heat medium channel 10 can be made relatively high. This makes it possible to reduce the amount of material used when forming the mold 1 by additive manufacturing, shorten the time required for formation, or increase the amount of heat medium to flow inside the mold 1.

Furthermore, the fact that the heat medium channel 10 has a two-dimensional honeycomb shape may mean that the inside of the mold 1 is essentially uniformly thinned out (made thinner). Therefore, the residual stress occurring when producing (shaping) the mold 1 by additive manufacturing can be reduced, thus resulting in an advantage in that warpage or other deformations and fissures can be suppressed.

Figure 17:
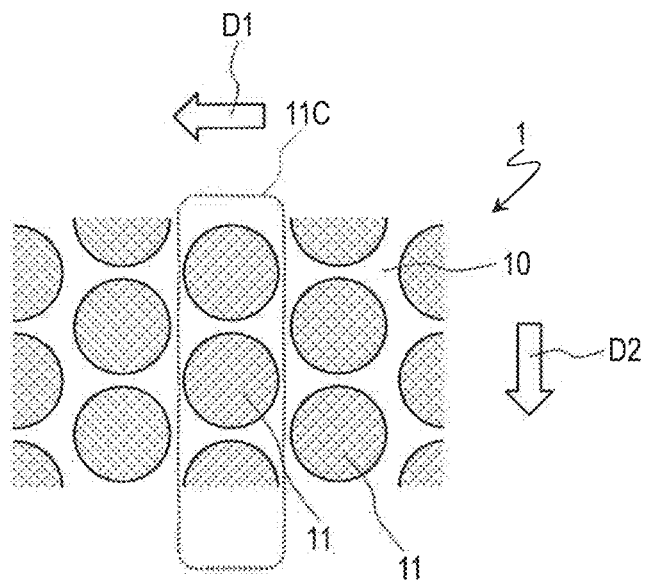
FIG. 17 is a plan view showing another exemplary shape (shape of solid portions 11) of the heat medium channel 10.
Figure 18:
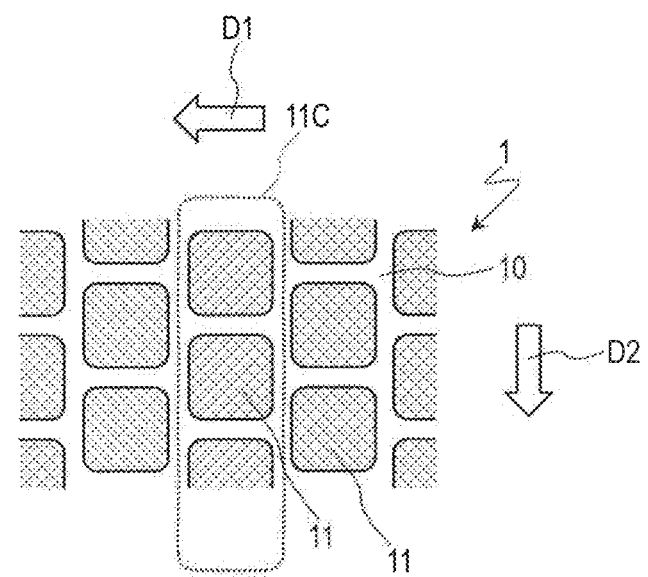
FIG. 18 is a plan view showing still another exemplary shape (shape of solid portions 11) of the heat medium channel 10.

Note that the shape of the unit structure of the two-dimensional honeycomb is not limited to what is illustrated herein. In other words, the shape of each solid portion 11 is not limited to what is illustrated herein. Each solid portion 11 may be substantially polygonal, substantially circular, or substantially elliptical. FIG. 17 and FIG. 18 show other exemplary shapes of the solid portion 11. In the example shown in FIG. 17, the solid portions 11 are substantially circular. In the example shown in FIG. 18, the solid portions 11 are substantially square. Regardless of whether the solid portions 11 are substantially polygonal, substantially circular, or substantially elliptical, there is provided an effect of allowing the heat medium to flow uniformly and so as to constitute a turbulence.

From the standpoint of allowing the heat medium to uniformly flow, it is preferable that two adjacent solid portion rows 11C are arranged so that the positions of their respective solid portions 11 along the second direction D2 are offset by substantially a half of the pitch P, as shown in FIG. 15 and the like.

Moreover, as shown in FIG. 16 and the like, it is preferable that the heat medium channel 10 includes: first portions 10a extending substantially in parallel to the first direction D1; and a second portion 10b and a third portion 10c extending from an end of each first portion 10a substantially in parallel to a third direction D3 and a fourth direction D4, respectively, that are mutually symmetric with respect to the first direction D1. With the heat medium channel 10 being composed of the first portions 10a, second portions 10b and third portions 10c as such, there will be essentially equal probabilities that the heat medium flowing in a first portion 10a may try to flow into the second portion 10b and the third portion 10c upon arriving at the end of the first portion 10a; this makes it even easier for the heat medium to uniformly flow in the mold 1.

There is no particular limitation as to the channel diameter of the heat medium channel 10. Moreover, there is no particular limitation as to the number of solid portion rows 11C, or the number of solid portions 11 included in each solid portion row 11C. The channel diameter of the heat medium channel 10, the number of solid portion rows 11C, the number of solid portions 11 included in each solid portion row 11C, may be set as appropriate in accordance with the size, purpose, etc., of the mold 1.

In the mold 1 including the heat medium channel 10 having a two-dimensional honeycomb shape, too, crack growth can be prevented by disposing the buffer layer 20 between the mold surface 1a and the heat medium channel 10.

Figure 19:
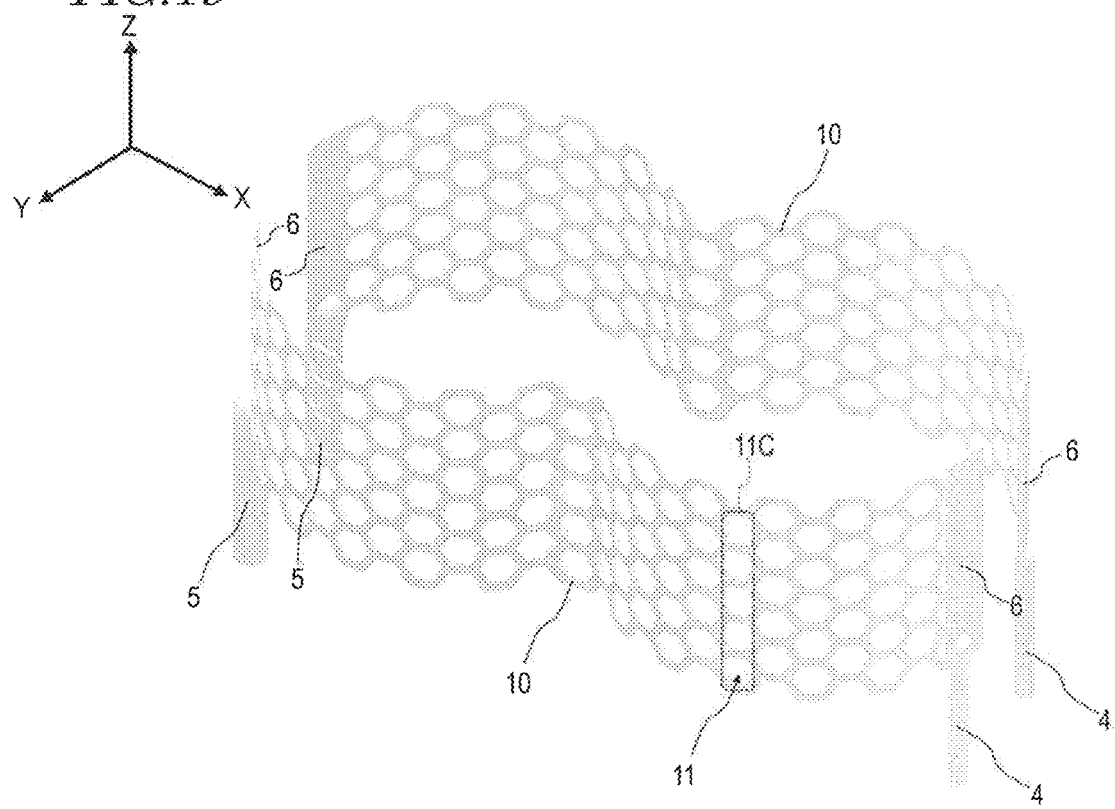
FIG. 19 is a perspective view showing still another example of the heat medium channel 10.

Although an example where a single set consisting of the heat medium channel 10, the medium introduction port 4, and the medium discharge port 5 is provided in the mold 1 has been described, a plurality of such sets may be provided in the mold 1. FIG. 19 shows an example of such construction.

FIG. 19 shows two sets that are provided in the mold 1. One of the two sets is disposed on one side along the Y direction (the front side in the figure) in the mold 1, while the other is disposed on the other side along the Y direction (the rear side in the figure). The number of sets of the heat medium channel 10, the medium introduction port 4, and the medium discharge port 5 may be determined in accordance with the size, purpose, etc., of the mold 1. Note that the example shown in FIG. 19 illustrates that there are five solid portions 11 in each solid portion row 11C of the heat medium channel 10, unlike in the example illustrated in FIG. 14 and the like.

Figure 20:
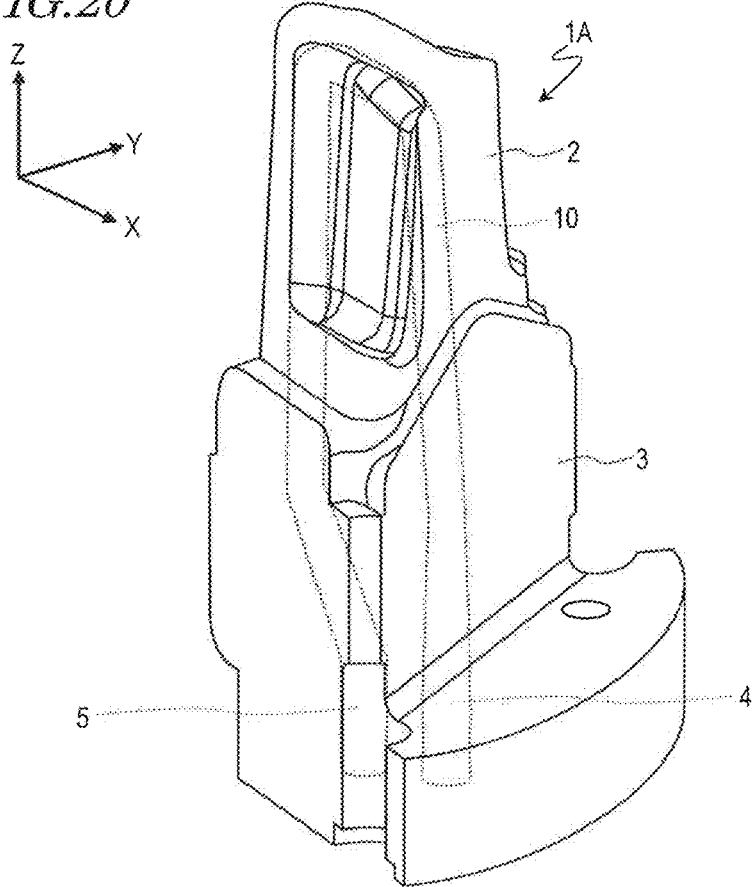
FIG. 20 is a perspective view schematically showing another mold 1A according to an embodiment of the present invention, where a heat medium channel 10 inside the mold 1A is depicted with dotted lines.
Figure 21:
FIG. 21 is a perspective view schematically showing the heat medium channel 10.

Note that the heat medium channel 10 does not need to be either one of a three-dimensional honeycomb shape or a two-dimensional honeycomb shape. Another example of the heat medium channel 10 is shown in FIG. 20 and FIG. 21. FIG. 20 is a perspective view schematically showing another mold 1A according to an embodiment of the present invention, whereas FIG. 21 is a diagram schematically showing a heat medium channel 10 of the mold 1A.

In the example shown in FIG. 20 and FIG. 21, the heat medium channel 10 is U-shaped. In the mold 1A having such a heat medium channel 10, too, crack growth can be prevented by disposing the buffer layer 20 between each heat medium channel 10 and the mold surface 1a.

[Other Constructions of Buffer Layer]

Although the heat-conducting portion 22 illustrated in the above description has a three-dimensional mesh shape, the shape of the heat-conducting portion 22 in the buffer layer 20 is not limited thereto.

Figure 22:
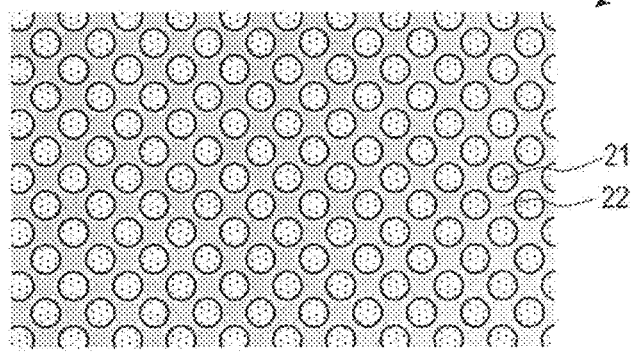
FIG. 22 is a diagram showing another example of the buffer layer 20, FIG. 22 being a cross-sectional view taken along a plane which is orthogonal to the thickness direction.
Figure 23:
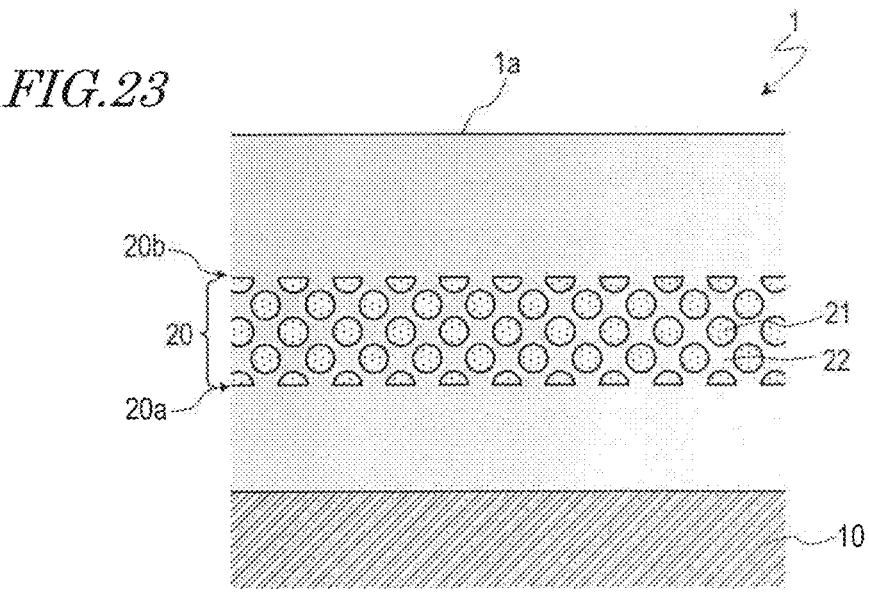
FIG. 23 is a diagram showing the buffer layer 20 and its neighborhood, FIG. 23 being a cross-sectional view taken along the thickness direction of the buffer layer 20.

FIG. 22 and FIG. 23 show another example of the buffer layer 20. FIG. 22 is a diagram showing another example of the buffer layer 20, FIG. 22 being a cross-sectional view taken along a plane which is orthogonal to the thickness direction. FIG. 23 is a diagram showing the buffer layer 20 and its neighborhood, FIG. 23 being a cross-sectional view taken along the thickness direction of the buffer layer 20.

In the example shown in FIG. 22 and FIG. 23, the heat-conducting portion 22 of the buffer layer 20 has a three-dimensional honeycomb shape. In other words, the heat-conducting portion 22 has a three-dimensional meshed structure in which unit structures of substantially the same shape are arranged so as to leave no spaces. As shown in FIG. 23, the heat-conducting portion 22 continues from the first end face 20a to the second end face 20b of the buffer layer 20. In the buffer layer 20, regions other than the heat-conducting portion 22 of a three-dimensional honeycomb shape are low-melting percentage portions 21. Herein, the low-melting percentage portions 21 are a plurality of substantially spherical regions.

In the case where the heat-conducting portion 22 of the buffer layer 20 has a three-dimensional honeycomb shape, too, the heat-conducting portion 22 may allow heat from the mold surface 1a side to be conducted to the heat medium channel 10 side (or conversely, heat from the heat medium channel 10 side to be conducted to the mold surface 1a side), so that temperature control by the heat medium channel 10 can be performed more suitably.

Figure 24:
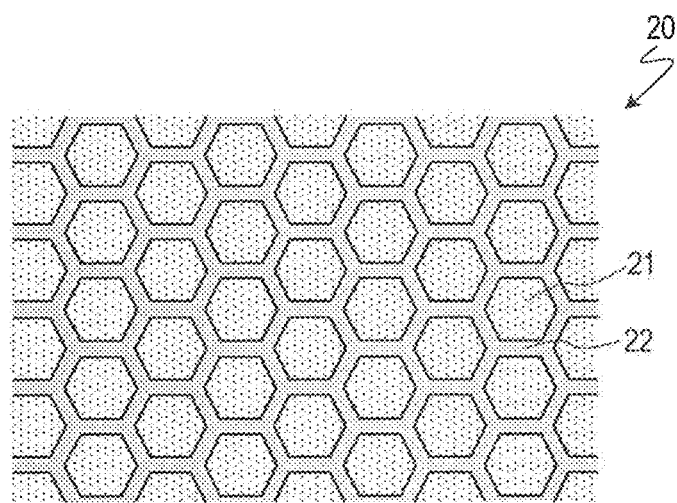
FIG. 24 is a diagram showing still another example of the buffer layer 20, FIG. 24 being a cross-sectional view taken along a plane which is orthogonal to the thickness direction.
Figure 25:
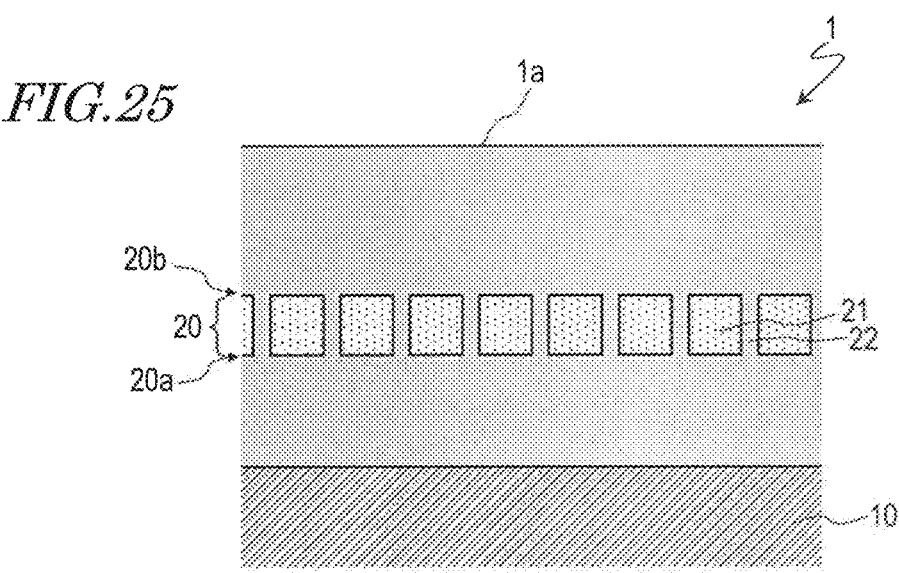
FIG. 25 is a diagram showing the buffer layer 20 and its neighborhood, FIG. 25 being a cross-sectional view taken along the thickness direction of the buffer layer 20.

FIG. 24 and FIG. 25 show still another example of the buffer layer 20. FIG. 24 is a diagram showing still another example of the buffer layer 20, FIG. 24 being a cross-sectional view taken along a plane which is orthogonal to the thickness direction. FIG. 25 is a diagram showing the buffer layer 20 and its neighborhood, FIG. 25 being a cross-sectional view taken along the thickness direction of the buffer layer 20.

In the example shown in FIG. 24 and FIG. 25, the heat-conducting portion 22 of the buffer layer 20 has a two-dimensional honeycomb shape. In other words, the heat-conducting portion 22 has a two-dimensional meshed structure in which unit structures of substantially the same shape are arranged so as to leave no spaces. As shown in FIG. 25, the heat-conducting portion 22 continues from the first end face 20a to the second end face 20b of the buffer layer 20. In the buffer layer 20, regions other than the heat-conducting portion 22 of a two-dimensional honeycomb shape are low-melting percentage portions 21. Herein, the low-melting percentage portions 21 is a plurality of regions shaped as substantially hexagonal cylinders.

In the case where the heat-conducting portion 22 of the buffer layer 20 has a two-dimensional honeycomb shape, too, the heat-conducting portion 22 may allow heat from the mold surface 1a side to be conducted to the heat medium channel 10 side (or conversely, heat from the heat medium channel 10 side to be conducted to the mold surface 1a side), so that temperature control by the heat medium channel 10 can be performed more suitably.

Figure 26:
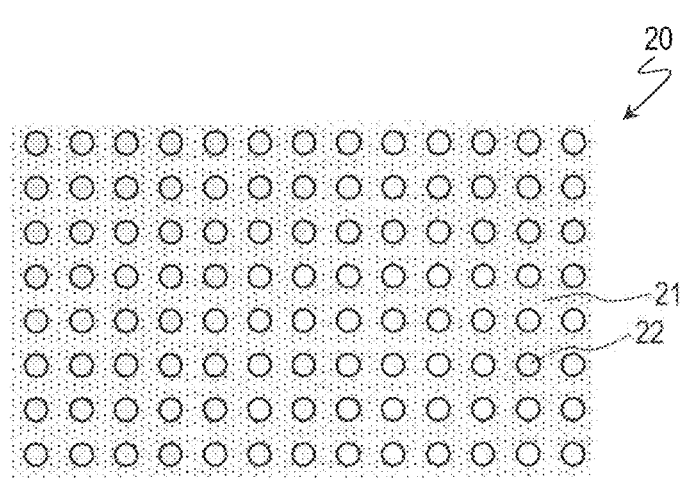
FIG. 26 is a diagram showing still another example of the buffer layer 20, FIG. 26 being a cross-sectional view taken along a plane which is orthogonal to the thickness direction.
Figure 27:
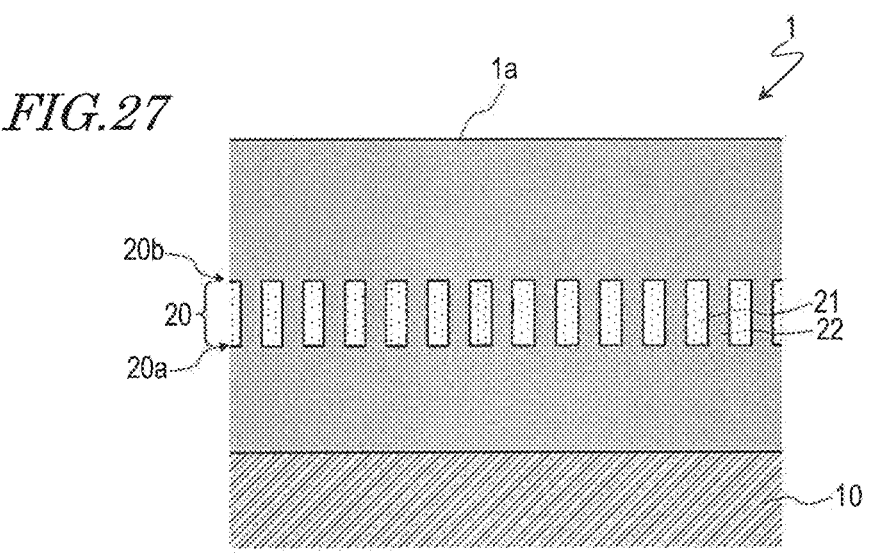
FIG. 27 is a diagram showing the buffer layer 20 and its neighborhood, FIG. 27 being a cross-sectional view taken along the thickness direction of the buffer layer 20.

FIG. 26 and FIG. 27 show still another example of the buffer layer 20. FIG. 26 is a diagram showing still another example of the buffer layer 20, FIG. 26 being a cross-sectional view taken along a plane which is orthogonal to the thickness direction. FIG. 27 is a diagram showing the buffer layer 20 and its neighborhood, FIG. 27 being a cross-sectional view taken along the thickness direction of the buffer layer 20.

In the example shown in FIG. 26 and FIG. 27, the heat-conducting portion 22 of the buffer layer 20 is a plurality of columnar bodies extending from the first end face 20a to the second end face 20b of the buffer layer 20. In the buffer layer 20, regions other than the heat-conducting portion 22 (i.e., regions from which the plurality of columnar bodies are removed) are low-melting percentage portions 21.

In the case where the heat-conducting portion 22 of the buffer layer 20 is a plurality of columnar bodies, too, the heat-conducting portion 22 may allow heat from the mold surface 1a side to be conducted to the heat medium channel 10 side (or conversely, heat from the heat medium channel 10 side to be conducted to the mold surface 1a side), so that temperature control by the heat medium channel 10 can be performed more suitably. Although a case where each of the plurality of columnar bodies is cylindrical is illustrated herein, the shape of a columnar body is not limited thereto, but may be prisms, e.g., a quadrangular prism or a hexagonal prism.

The buffer layer 20 may have a structure different from what has been illustrated above. For example, in a 3D printer, it is known that a porous structure can be formed by adjusting the conditions of laser irradiation for a metal powder (e.g., by performing random irradiation). The buffer layer 20 may have a structure resembling such a porous structure. In the portions that would correspond to "pores" of a porous structure, unsintered or unmelted metal powder exists, functioning as low-melting percentage portions.

Figure 28:
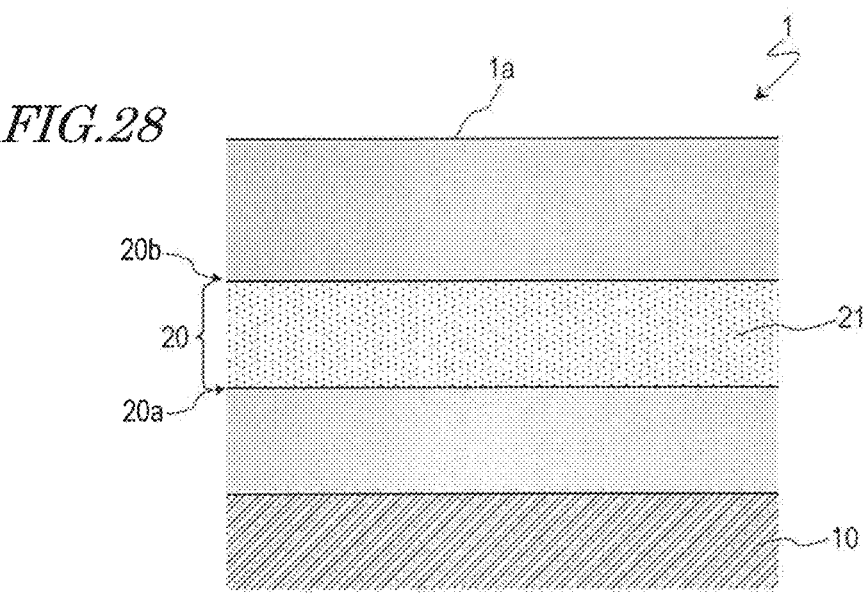
FIG. 28 is a diagram showing the buffer layer 20 lacking a heat-conducting portion 22 and its neighborhood, FIG. 28 being a cross-sectional view taken along the thickness direction of the buffer layer 20.

Moreover, as shown in FIG. 28, the buffer layer 20 may not have any heat-conducting portion 22. In other words, the buffer layer 20 may have low-melting percentage portions 21 only.

Now, a result of a simulation study for a buffer layer 20 which lacks a heat-conducting portion 22, concerning influences on the cooling ability, will be described.

Figure 29:
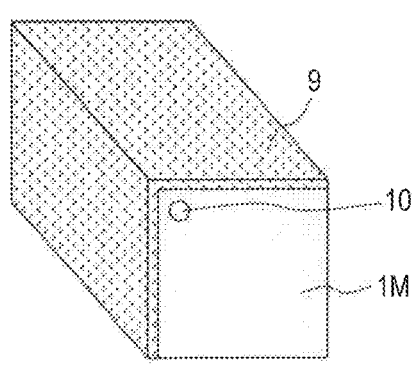
FIG. 29 is a diagram showing model A, which was used to study influences of the buffer layer 20 on cooling ability.
Figure 30:
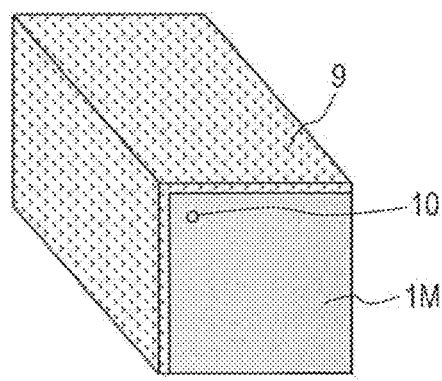
FIG. 30 is a diagram showing model B, which was used to study influences of the buffer layer 20 on cooling ability.
Figure 31:
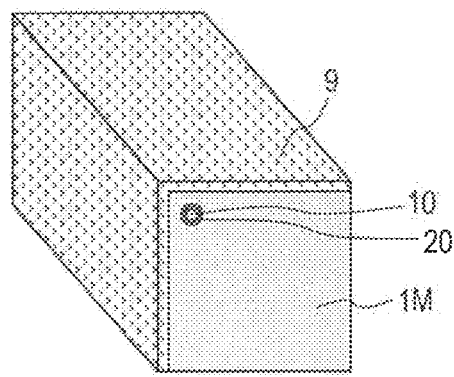
FIG. 31 is (a) is a diagram showing model C, which was used to study influences of the buffer layer 20 on cooling ability; and (b) is a diagram showing, enlarged, a partial region (neighborhood of the heat medium channel 10) in (a).
Figure 31:
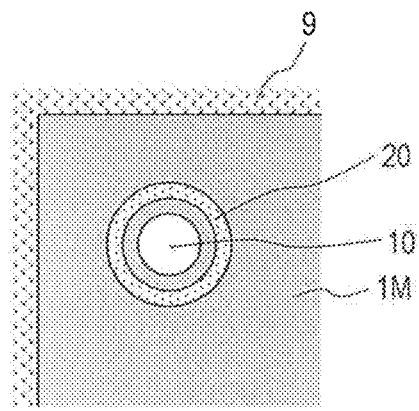

The simulation was conducted with respect to three models (referred to as "model A", "model B", and "model C", respectively) shown in FIG. 29, FIG. 30, and FIG. 31. In each model, melt 9 is located around the mold 1M, and a heat medium channel 10 is disposed near the surface of the mold 1M. The heat medium channel 10 has a circular cross-sectional shape, and the distance from the surface of the mold 1M to the center axis of the heat medium channel 10 is 10 mm.

In model A shown in FIG. 29, the heat medium channel 10 has a diameter of 6 mm. In model B shown in FIG. 30, the heat medium channel 10 has a diameter of 3 mm. In model C shown in FIGS. 31(a) and (b), the heat medium channel 10 has a diameter of 3 mm.

In model C, the buffer layer 20 is disposed so as to surround the heat medium channel 10. The buffer layer 20 has a thickness of 1.5 mm. The buffer layer 20 has an annular cross section, and the distance from the inner peripheral surface of the buffer layer 20 to the outer peripheral surface of the heat medium channel 10 is 2 mm or more.

In each model, the melt 9 had an initial temperature of 630° C., and the mold 1M and the buffer layer 20 had an initial temperature of 150° C. The heat transfer coefficient between the melt 9 and the mold 1M was 3000 W/m²·K. The convection modulus of a heat medium flowing in the heat medium channel 10 was 5000 W/m²·K, with a temperature of 30° C. The material of the mold 1M was a steel for use in molds, whereas the material of the melt 9 was an aluminum alloy for use in die casting. Steels for use in molding and aluminum alloy for use in die casting had thermal conductivities and specific heats as shown in Table 1. As can be seen from Table 1, the thermal conductivity and the specific heat of the buffer layer 20 were ½ of the thermal conductivity and the specific heat, respectively, of iron.

TABLE 1

|  | mold | melt | buffer layer |
|---|---|---|---|
| material | steel for molding | aluminum alloy for die casting | — |
| thermal conductivity | 26.7 W/m · K | 176396 μW/mm · K | 13.35 W/m · K |
| specific heat | $4.34 \times 10^8$ μJ/kg · K | $1.175 \times 10^9$ μJ/kg · K | $2.17 \times 108$ μJ/kg · K |

By using analysis software (NX manufactured by Siemens AG), a temperature profile of the inside of the mold 1M after 2 seconds from an initial state was examined, which proved that model C had attained a level of cooling comparable to those by models A and B.

[Applications to Other Molds]

Although the above description illustrates a mold 1 for forming at least a portion of a wheel for vehicles, embodiments of the present invention are not limited to such molds. Embodiments of the present invention are broadly applicable to a variety of molds, and may be suitably used, for example, in molds for forming at least a portion of frame parts for vehicles, cylinder blocks or crankcases for engines, and the like.

As described above, a mold 1 (or 1A) according to an embodiment of the present invention is a mold 1 which is formed by additive manufacturing, including: a heat medium channel 10 for a heat medium to flow through, the heat medium channel 10 being provided inside the mold; a medium introduction port 4 at which the heat medium is to be introduced into the mold; a medium discharge port 5 at which the heat medium is to be discharged out of the mold; and a buffer layer 20 located between the mold surface 1a and the heat medium channel 10, the buffer layer 20 including low-melting percentage portions 21 having a lower melting percentage than does any portion inside the mold other than the buffer layer 20.

A mold 1 according to an embodiment of the present invention includes a buffer layer 20 located between the mold surface 1a and the heat medium channel 10, the buffer layer 20 including low-melting percentage portions 21 having a lower melting percentage than does any portion inside the mold other than the buffer layer 20. The low-melting percentage portions 21 of the buffer layer 20 are portions having a lower continuity (as a structural body), i.e., a higher discontinuity, than does any other portion, thus defining portions where cracks are less likely to grow. Therefore, since the buffer layer 20 is located between the mold surface 1a and the heat medium channel 10, even if a crack occurs at the heat medium channel 10 side, its growth onto the mold surface 1a side can be prevented by the buffer layer 20. As a result, in the mold 1 according to an embodiment of the present invention, leaks of the heat medium can be prevented.

In one embodiment, the low-melting percentage portions 21 have a melting percentage of 50% or less.

From the standpoint of preventing crack growth, the melting percentage of the low-melting percentage portions 21 is preferably as low as possible; specifically, it is preferably 50% or less.

In one embodiment, the low-melting percentage portions 21 are composed of unsintered or unmelted metal powder.

When the low-melting percentage portions 21 are composed of unsintered or unmelted metal powder, the low-melting percentage portions 21 have a melting percentage which is substantially 0%, thus resulting in a high effect of preventing crack growth.

In one embodiment, the buffer layer 20 further includes a heat-conducting portion 22 having a higher melting percentage than do the low-melting percentage portions 21, the heat-conducting portion 22 continuing from the first end face 20a at the heat medium channel 10 side, to the second end face 20b at the mold surface 1a side, of the buffer layer 20.

The buffer layer 20 may include a heat-conducting portion 22 having a higher melting percentage than do the low-melting percentage portions 21, the heat-conducting portion 22 continuing from the first end face 20a at the heat medium channel 10 side, to the second end face 20b at the mold surface 1a side, of the buffer layer 20. Since the heat-conducting portion 22 allows heat from the mold surface 1a side to be conducted to the heat medium channel 10 side (or conversely, heat from the heat medium channel 10 side to be conducted to the mold surface 1a side), because of the buffer layer 20 including the heat-conducting portion 22, temperature control by the heat medium channel 10 can be performed more suitably.

In one embodiment, the melting percentage of the heat-conducting portion 22 is substantially equal to that of any portion inside the mold other than the buffer layer 20.

From the standpoint of suitably allowing heat to be conducted from the mold surface 1a side to the heat medium channel 10 side, or from the heat medium channel 10 side to the mold surface 1a side, melting percentage of the heat-conducting portion 22 is preferably as high as possible, and most preferably substantially equal to that of any portion inside the mold other than the buffer layer 20.

In one embodiment, the heat-conducting portion 22 has a three-dimensional mesh shape.

When the heat-conducting portion 22 has e.g. a three-dimensional mesh shape, heat conduction can be suitably performed.

In one embodiment, the heat-conducting portion 22 has a three-dimensional honeycomb shape.

When the heat-conducting portion 22 has e.g. a three-dimensional honeycomb shape, heat conduction can be suitably performed.

In one embodiment, the heat-conducting portion 22 has a two-dimensional honeycomb shape.

When the heat-conducting portion 22 has e.g. a two-dimensional honeycomb shape, heat conduction can be suitably performed.

In one embodiment, the heat-conducting portion 22 is a plurality of columnar bodies extending from the first end face 20a to the second end face 20b.

When the heat-conducting portion 22 is e.g. a plurality of columnar bodies extending from the first end face 20a to the second end face 20b, heat conduction can be suitably performed.

In one embodiment, the buffer layer 20 has a thickness t of 2.0 mm or more.

The thickness of the buffer layer is preferably 2.0 mm or more. When the thickness of the buffer layer is 2.0 mm or more, the effect of preventing crack growth can be attained with a greater certainty.

In one embodiment, heat medium channel 10 has a three-dimensional honeycomb shape.

When the heat medium channel 10 has a three-dimensional honeycomb shape, the heat medium is allowed to flow uniformly and so as to constitute a turbulence within the mold 1. This allows temperature control of the mold 1 to be suitably achieved with the heat medium channel 10. Moreover, when the heat medium channel 10 has a three-dimensional honeycomb shape, the proportion inside the mold that is accounted for by the heat medium channel 10 can be easily made high. Therefore, the amount of raw material required for producing the mold 1 can be reduced, or the amount of time required for production can be reduced. Furthermore, the fact that the heat medium channel 10 has a three-dimensional honeycomb shape may mean that the inside of the mold 1 is essentially uniformly thinned out (made thinner). Therefore, the residual stress occurring when producing (shaping) the mold 1 by additive manufacturing can be reduced, thus resulting in an advantage in that warpage or other deformations and fissures can be suppressed.

In one embodiment, the heat medium channel 10 has a two-dimensional honeycomb shape.

When the heat medium channel 10 has a two-dimensional honeycomb shape, the heat medium is allowed to flow uniformly and so as to constitute a turbulence within the mold 1. This allows temperature control of the mold 1 to be suitably achieved with the heat medium channel 10. Moreover, when the heat medium channel 10 has a two-dimensional honeycomb shape, the proportion inside the mold that is accounted for by the heat medium channel 10 can be easily made high. Therefore, the amount of raw material required for producing the mold 1 can be reduced, or the amount of time required for production can be reduced. Furthermore, the fact that the heat medium channel 10 has a two-dimensional honeycomb shape may mean that the inside of the mold 1 is essentially uniformly thinned out (made thinner). Therefore, the residual stress occurring when producing (shaping) the mold 1 by additive manufacturing can be reduced, thus resulting in an advantage in that warpage or other deformations and fissures can be suppressed.

In one embodiment, the mold 1 is a mold for forming at least a portion of a wheel for vehicles, a frame part for vehicles, a cylinder block, or a crankcase.

Embodiments of the present invention are suitably used for molds for forming at least a portion of a wheel for vehicles or a frame part for vehicles. Moreover, embodiments of the present invention are also suitably used for molds for forming at least a portion of an engine part such as a cylinder block or a crankcase.

INDUSTRIAL APPLICABILITY

In accordance with an embodiment of the present invention, in a mold which is formed by additive manufacturing, leaks of the heat medium that are ascribable to crack growth can be prevented. Embodiments of the present invention can be suitably used in various molds.

REFERENCE SIGNS LIST

1: mold, 2: protrusion, 3: base, 4: medium introduction port, 5: medium discharge port, 6: broad portion, 7: thin portion, 8: thick portion, 9: melt, 10: heat medium channel, 10*a*: first portion of heat medium channel, 10*b*: second portion of heat medium channel, 10*c*: third portion of heat medium channel, 11: solid portion, 11C: solid portion row, 20: buffer layer, 21: low-melting percentage portion, 22: heat-conducting portion

The invention claimed is:

1. A mold which is formed by additive manufacturing, comprising:
   a heat medium channel for a heat medium to flow through, the heat medium channel being provided inside the mold;
   a medium introduction port at which the heat medium is to be introduced into the mold;
   a medium discharge port at which the heat medium is to be discharged out of the mold; and
   a buffer layer located between a mold surface and the heat medium channel, wherein,
   the buffer layer includes a low-melting percentage portion having a lower melting percentage than does any portion inside the mold other than the buffer layer, wherein the low-melting percentage portion is composed of unsintered or unmelted metal powder.

2. The mold of claim 1, wherein the low-melting percentage portion has a melting percentage of 50% or less.

3. The mold of claim 1, wherein the buffer layer further includes a heat-conducting portion having a higher melting percentage than does the low-melting percentage portion, the heat-conducting portion continuing from a first end face at a heat medium channel side, to a second end face at a mold surface side, of the buffer layer.

4. The mold of claim 3, wherein the melting percentage of the heat-conducting portion is substantially equal to a melting percentage of the any portion inside the mold other than the buffer layer.

5. The mold of claim 3, wherein the heat-conducting portion has a three-dimensional mesh shape.

6. The mold of claim 3, wherein the heat-conducting portion has a three-dimensional honeycomb shape.

7. The mold of claim 3, wherein the heat-conducting portion has a two-dimensional honeycomb shape.

8. The mold of claim 3, wherein the heat-conducting portion comprises a plurality of columnar bodies extending from the first end face to the second end face.

9. The mold of claim 1, wherein the buffer layer has a thickness of 2.0 mm or more.

10. The mold of claim 1, wherein the heat medium channel has a three-dimensional honeycomb shape.

11. The mold of claim 1, wherein the heat medium channel has a two-dimensional honeycomb shape.

12. The mold of claim 1, being a mold for forming at least a portion of a wheel for vehicles, a frame part for vehicles, a cylinder block, or a crankcase.

* * * * *